(12) United States Patent
Langer

(10) Patent No.: US 9,654,205 B1
(45) Date of Patent: May 16, 2017

(54) SYSTEMS, METHODS AND APPARATUS FOR ASSEMBLING A TRANSPORT STREAM FROM SATELLITE TRANSPONDER SIGNALS

(71) Applicant: EchoStar Technologies, L.L.C., Englewood, CO (US)

(72) Inventor: Paul Langer, Westminster, CO (US)

(73) Assignee: ECHOSTAR TECHNOLOGIES L.L.C., Englewood, CO (US)

( * ) Notice: Subject to any disclaimer, the term of this patent is extended or adjusted under 35 U.S.C. 154(b) by 0 days.

(21) Appl. No.: 14/962,627

(22) Filed: Dec. 8, 2015

(51) Int. Cl.
H04N 21/44 (2011.01)
H04B 7/185 (2006.01)
H04W 84/06 (2009.01)

(52) U.S. Cl.
CPC ........... *H04B 7/1858* (2013.01); *H04W 84/06* (2013.01)

(58) Field of Classification Search
CPC .......... G01S 2007/4082; G01S 7/4052; H04H 20/63; H04H 40/90
See application file for complete search history.

(56) References Cited

U.S. PATENT DOCUMENTS

| | | | |
|---|---|---|---|
| 7,477,871 B1 | 1/2009 | Gurantz et al. | |
| 7,502,587 B2 | 3/2009 | Petruzzelli et al. | |
| 7,941,091 B1 * | 5/2011 | Doherty | H04H 20/63 455/272 |
| 7,991,348 B2 | 8/2011 | Norin et al. | |
| 8,238,813 B1 | 8/2012 | Popoli et al. | |
| 8,434,120 B2 | 4/2013 | Gutknecht et al. | |
| 8,572,661 B2 | 10/2013 | Strong et al. | |
| 8,666,071 B2 | 3/2014 | Weber | |
| 8,712,318 B2 | 4/2014 | Norin et al. | |
| 9,008,307 B2 | 4/2015 | Weber | |
| 9,432,728 B1 * | 8/2016 | Rothaus | H04N 21/6193 |
| 2001/0036355 A1 * | 11/2001 | Kelly | G11B 27/034 386/290 |
| 2006/0031894 A1 | 2/2006 | Petruzzelli | |
| 2008/0112385 A1 | 5/2008 | Bargroff et al. | |

(Continued)

OTHER PUBLICATIONS

"System considerations for building a high-performance digital satellite TV receiver front-end", DeCanne, Mar. 2006. http://defenseelectronicsmag.com/site-files/defenseelectronicsmag.com/files/archive/rfdesign.com/mag/603RFDF4.pdf.

(Continued)

*Primary Examiner* — Bobbak Safaipour
(74) *Attorney, Agent, or Firm* — Perkins Coie LLP

(57) ABSTRACT

Various embodiments of systems, apparatus, and methods are described for assembling at least one transport stream from satellite transponder signals. In one example, the method includes capturing at least one satellite feed, the at least one satellite feed including a plurality of transponder signals; demodulating each of the plurality of transponder signals, each demodulated transponder signal corresponding to a transport stream including a plurality of input streams; parsing one or more selected streams from the plurality of input streams; assembling at least one new transport stream from the one or more selected streams; modulating the at least one new transport stream to generate at least one new transponder signal; adding the at least one new transponder signal to a channel stack; and transmitting the channel stack to a receiving device.

17 Claims, 8 Drawing Sheets

(56) References Cited

U.S. PATENT DOCUMENTS

| | | |
|---|---|---|
| 2009/0290659 A1* | 11/2009 | Petrovic ................ H04H 20/30 375/340 |
| 2011/0167459 A1 | 7/2011 | Holme et al. |
| 2012/0278843 A1 | 11/2012 | Carmichael |
| 2014/0033258 A1 | 1/2014 | Beals et al. |
| 2015/0089548 A1 | 3/2015 | Petruzzelli |

OTHER PUBLICATIONS

PCT/US2016/065617, International Search Report and Written Opinion, Mar. 20, 2017, 9 pages.

* cited by examiner

| Video Stream 1 509-1 | Video Stream 2 509-2 | Video Stream 3 509-3 | Video Stream 4 509-4 | ••• | Video Stream 10 509-10 | EMM/ECM Information 515 |
|---|---|---|---|---|---|---|

New A/V Transponder 511-a

*FIG. 5A*

| EMM/ECM Information 515 | NIT/NAT Information 517 | PAT/PMT Information 519 | Transponder Information 521 | LNBF Information 523 | Signal Quality Information 525 |
|---|---|---|---|---|---|

New Informational Transponder 511-b

*FIG. 5B*

SYSTEMS, METHODS AND APPARATUS FOR ASSEMBLING A TRANSPORT STREAM FROM SATELLITE TRANSPONDER SIGNALS

BACKGROUND

A single satellite will typically have multiple transponders (e.g., 32 transponders), each transponder broadcasting or corresponding to a channel or band, and each transponder in turn may carry a combined stream of digital data comprising a number of video programs or other content.

A low-noise frequency block downconverter with integrated feedhorn (LNBF) of a receiving antenna translates the frequency of a received satellite feed to a lower frequency more suitable for transmission over coaxial cable to a receiving device. The receiving device includes tuner/demodulators which may tune and demodulate one or more of the transponders. The receiving device may then parse and decode one or more of the digital data streams carried by the tuned transponder.

SUMMARY

The present disclosure relates to systems, methods, and apparatus for assembling a transport stream from satellite transponder signals. In one implementation, a method includes capturing at least one satellite feed, the at least one satellite feed comprising a plurality of transponder signals; demodulating each of the plurality of transponder signals, each demodulated transponder signal corresponding to a transport stream comprising a plurality of input streams; parsing one or more selected streams from the plurality of input streams; assembling at least one new transport stream from the one or more selected streams; modulating the at least one new transport stream to generate at least one new transponder signal at a desired frequency; adding the at least one new transponder signal to a channel stack; and transmitting the channel stack to a receiving device.

In some examples, the plurality of transponder signals are from a plurality of satellite feeds. In some examples, the method further includes assembling a plurality of new transport streams from the one or more selected streams, wherein the number of new transport streams exceeds the number of transponder signals from a single satellite feed. In some examples, the number of new transport streams is associated with a tuning capability of the receiving device.

In some examples, the method includes selecting the one or more selected streams based on user preferences, bandwidth available in a coaxial feed, capabilities of the receiving device, or a combination thereof. In some examples, the method includes parsing informational and control data from the plurality of input streams; and assembling at least one informational transport stream from the informational and control data. In some examples, the informational and control data includes one or more of entitlement management message/entitlement control message (EMM/ECM) information, network information table/network address translation (NIT/NAT) information, program acquisition table/program map table (PAT/PMT) information, transponder information, LNBF information, and signal quality information. In some examples, the informational and control data may be a separate information stream or added to one or more program streams. In some examples, the channel stack is transmitted to the receiving device as a coaxial feed.

In one implementation, a stream packing apparatus includes a capture module for capturing at least one satellite feed, the at least one satellite feed comprising a plurality of transponder signals; a demodulator for demodulating each of the plurality of transponder signals, each demodulated transponder signal corresponding to a transport stream comprising a plurality of input streams; a parser for parsing one or more desired streams from the plurality of input streams; a stream assembler for assembling at least one new transport stream from the one or more desired streams; a radio frequency (RF) modulator for modulating the at least one new transport stream to generate at least one new transponder signal at a desired frequency; a RF combiner for adding the at least one new transponder signal to a channel stack; and a transmitter for transmitting the channel stack to a receiving device.

In some examples of the apparatus, the plurality of transponder signals are from a plurality of satellite feeds. In some examples, the stream assembler assembles a plurality of new transport streams from the one or more selected streams, and wherein the number of new transport streams exceeds the number of transponder signals from a single satellite feed. In some examples of the apparatus, the number of new transport streams is associated with a tuning capability of the receiving device.

In some examples of the apparatus, the one or more selected streams are selected based on user preferences, bandwidth available in a coaxial feed, capabilities of the receiving device, or a combination thereof. In some examples of the apparatus, the parser parses informational and control data from the plurality of input streams, and wherein the stream assembler assembles at least one informational transport stream from the informational and control data. In some examples of the apparatus, the informational and control data includes one or more of entitlement management message/entitlement control message (EMM/ECM) information, network information table/network address translation (NIT/NAT) information, program acquisition table/program map table (PAT/PMT) information, transponder information, LNBF information, and signal quality information. In some examples, the transmitter transmits the channel stack to the receiving device as a coaxial feed.

In one implementation, a satellite communication system includes a receiving antenna including at least one low-noise frequency block downconverter with integrated feedhorn (LNBF); a receiving device in communication with the receiving antenna; and a stream packer intermediate the receiving antenna and the receiving device. The stream packer includes a capture module for capturing at least one satellite feed from the at least one LNBF, the at least one satellite feed comprising a plurality of transponder signals; a demodulator for demodulating each of the plurality of transponder signals, each demodulated transponder signal corresponding to a transport stream comprising a plurality of input streams; a parser for parsing one or more desired streams from the plurality of input streams; a stream assembler for assembling at least one new transport stream from the one or more desired streams; a radio frequency (RF) modulator for modulating the at least one new transport stream to generate at least one new transponder signal at a desired frequency; a RF combiner for adding the at least one new transponder signal to a channel stack; and a transmitter for transmitting the channel stack to the receiving device.

It is to be understood that both the foregoing summary and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The same number represents the same element or same type of element in all drawings.

FIG. 5A illustrates an example of a new transponder signal, according to one non-limiting illustrated embodiment.

FIG. 5B illustrates another example of a new transponder signal, according to one non-limiting illustrated embodiment.

DETAILED DESCRIPTION OF THE DRAWINGS

Figure 1:
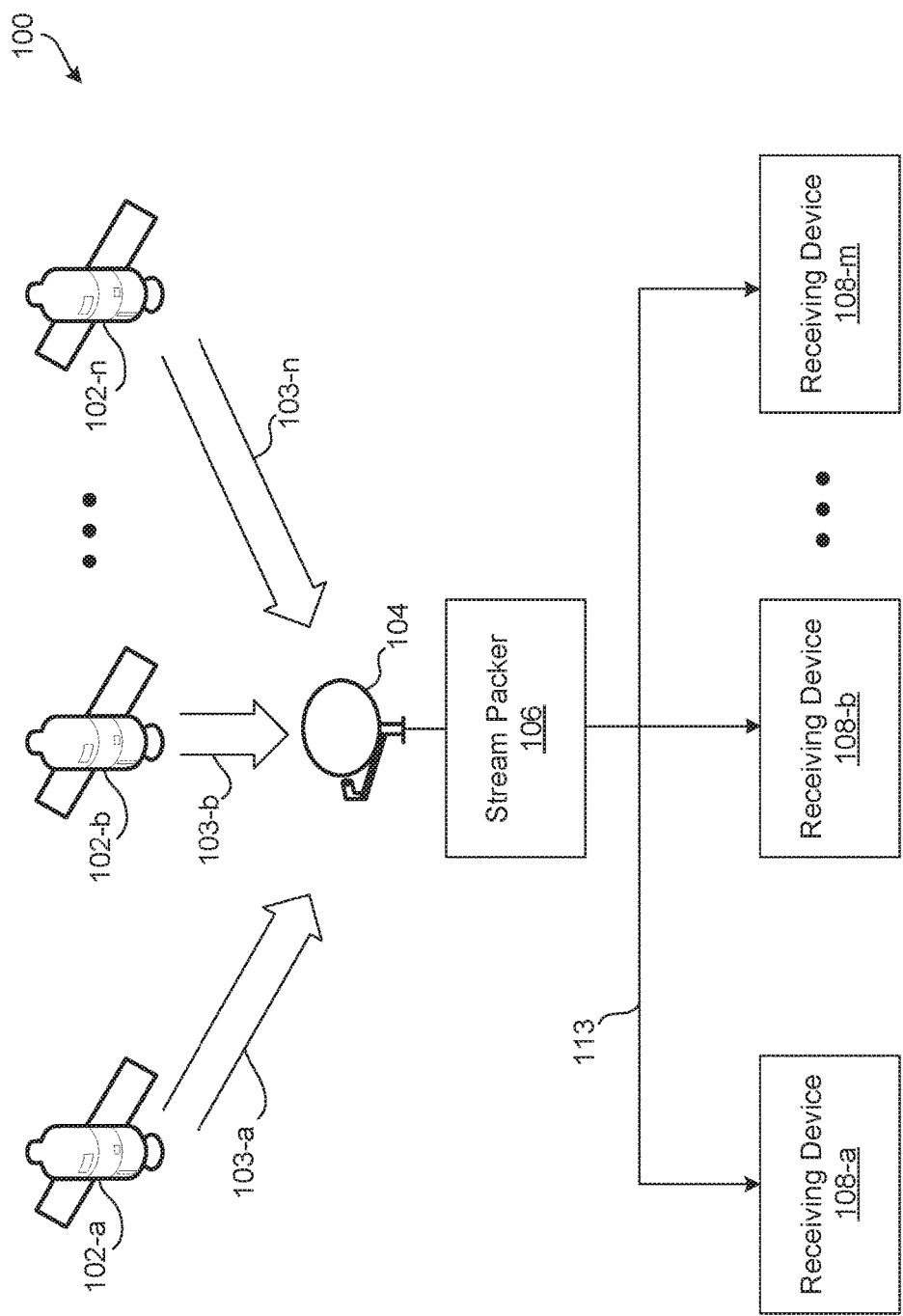
FIG. 1 is a block diagram of a satellite system, according to one non-limiting illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with receiving, processing, and outputting signals have not been shown or described in detail to avoid unnecessarily obscuring descriptions of the embodiments.

Unless the context requires otherwise, throughout the specification and claims which follow, the word "comprise" and variations thereof, such as "comprises" and "comprising," are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment.

The use of ordinals such as first, second and third does not necessarily imply a ranked sense of order, but rather may only distinguish between multiple instances of an act or structure.

The headings and Abstract of the Disclosure provided herein are for convenience only and do not interpret the scope or meaning of the embodiments.

The term "signal" may be any digital or analog signal. Those signals may include, but are not limited to, a bit, a specified set of bits, an AC signal, or a DC signal. Uses of the term "signal" in the description may include any of these different interpretations. It will also be understood to one skilled in the art that the term "connected" is not limited to a physical connection but can refer to any means of communicatively or operatively coupling two devices.

The disclosure uses the terms "television converter," "receiver," "set-top box," "receiving device," "television receiver," "television recording device," "set-top box (STB) ", "satellite set-top box," "satellite receiver," "cable set-top box," "cable receiver," and "television tuner" to refer interchangeably to a converter device or electronic equipment that has the capacity to acquire, process and distribute one or more signals transmitted by broadcast, cable, telephone, or satellite distributors. DVR and "personal video recorder (PVR)" refer interchangeably to devices that can record and play back signals and that may implement trick functions including, but not limited to, fast-forward, rewind and pause. DVR and PVR functionality or devices may be combined with a television converter. The signals transmitted by these broadcast, cable, telephone or satellite distributors may include, individually or in any combination, interne, radio, television or telephonic data or information. One skilled in the art will recognize that a television converter device may be implemented as an external self-enclosed unit, a plurality of external self-enclosed units or as an internal unit housed within a television. One skilled in the art will recognize that the present invention can apply to analog and digital satellite set-top boxes.

The term "television" refers to a television set or video display that may contain an integrated television converter device (e.g., an internal cable-ready television tuner housed inside a television) or, alternatively, that is connected to an external television converter device (e.g., an external set-top box connected via cabling to a television).

The term "transponder" is used herein to denote a particular carrier frequency or "sub-band" which can be tuned to by an appropriate tuner. In particular, note that "transponder" does not refer to a single program/content service (e.g., CNN®, HBO®, CSPAN®). Similarly, "tuning" herein refers to receiving a transponder (as previously defined) having multiple services thereon.

As a general matter, it should also be understood that satellite signals may be very different from broadcast television or other types of signals. Satellite signals may include multiplexed, packetized, and modulated digital signals. Once multiplexed, packetized and modulated, one satellite transmission may carry digital data representing several television stations or service providers and may include many transponders. Some examples of service providers include HBO®, CSPAN®, ABC®, CBS®, or ESPN®.

FIG. 1 is a block diagram of a satellite system 100, according to one non-limiting illustrated embodiment.

Satellites 102a-102n may broadcast streams of audio/video/data (herein more simply termed the "video streams") as downlink satellite feeds 103a-103n to a receiving antenna 104. Satellites 102a-102n may each have a number of transponders, each having an assigned frequency sub-band that is typically used to downlink a transport stream as part of the respective satellite feeds 103a-103n. It should be noted that video streams for a plurality of services (e.g., CNN®, HBO®, CSPAN®) may be transmitted by a single transponder. As set forth in the one example embodiment, many frequency sub-bands corresponding to many transponders may be transmitted as part of each satellite feed 103a-103n. In many embodiments, satellites 102a-102n may provide different or substantially different programming services.

The receiving antenna 104 includes one or more low-noise frequency block downconverter with integrated feedhorns (LNBFs) that takes one or more of the satellite feeds 103a-103n, separates the received signals, and then processes them independently and simultaneously, translating the frequency of the received signals to a lower frequency more suitable for transmission as a coaxial feed 113 to receiving devices 108a-108m. In some examples, the coaxial feed 113 may be the only connection between the receiving antenna 104 and the receiving devices 108a-108m. The receiving antenna 104 may be pointed and electronically configured so as to receive broadcasts from one or more of the satellites 102a-102n simultaneously.

The LNBF(s) of the receiving antenna may include a stream packer 106.

Alternatively, in some embodiments, the stream packer 106 may be a component of the receiving devices 108a-108m, or a standalone device between the receiving antenna 104 and the receiving devices 108a-108m. The stream packer 106 may use the satellite feeds 103a-103n to generate new transponder signals. The new transponder signals include new combinations of streams from the satellite transponders, as further described herein. The new transponder signals may then be added to a channel stack by the stream packer 106 to create the coaxial feed 113. Techniques for adding transponder signals to a channel stack are described in U.S. application Ser. No. 13/558,175, filed Jul. 25, 2012, which is incorporated by reference herein in its entirety.

By adding the new transponders to a channel stack in a coaxial feed 113, the stream packer 106 allows the new combinations of streams included in the new transponder signals to be compatible with a larger variety of receiving devices 108a-108m. The stream packer 106 also maximizes the number of relevant streams over a limited frequency spectrum and limited transponders available over the coaxial feed 113. Conventional channel stacking techniques only convert an entire transponder and all of its corresponding streams to a new frequency at the output. Thus, with conventional techniques, one relevant video stream may be present, while the remainder of the bandwidth is wasted on undesired content. The receiving devices 108a-108m may utilize tuner/demodulators, as further described herein, in order to receive and process the new combinations of streams, instead of utilizing more complex and less prevalent distribution systems, such as Multimedia over Coax Alliance (MoCA) systems.

In order to process the streams included in the coaxial feed 113, each receiving device 108a-108m tunes a transponder from the coaxial feed 113, demodulates the transponder signal, demultiplexes out a desired video stream, decompresses it from MPEG-4 (e.g., from H.264/MPEG-4 Part 10 or "Advanced Video Coding" (AVC)) or other compression format (e.g., MPEG-2, H.263, VC-1, VC-2 (Dirac), Windows Media Video (WMV), RealVideo, Theora, TrueMotion VP3, etc.) and reformats it into the appropriate video specification (e.g., National Television Standards Committee (NTSC), Phase Alternate Lines (PAL), and High-Definition Multimedia Interface (HDMI), etc.). Each receiving device 108a-108m may then output a video signal, as appropriate, to a display device or other devices.

The receiving devices 108a-108m include one or more tuner/demodulators that receive and process the coaxial feed 113. In one embodiment, one tuner/demodulator may acquire one or more transponder signals from the coaxial feed 113. Each transponder signal may represent a distinct frequency sub-band or source. For example, one tuner/demodulator may receive the 950 MHz to 1450 MHz frequency sub-band, while another tuner/demodulator may receive the 1650 MHz to 2150 MHz frequency sub-band. The tuner/demodulators of the receiving devices 108a-108m may initially process the coaxial feed 113 and also may receive user commands to tune to a transponder as part of the process of selecting a certain video stream for viewing on a display device. Such tuner/demodulators may include fewer, more, or different components. Also, the receiving devices 108a-108m may perform other functions and be connected to fewer or more devices. One skilled in the art will recognize that many embodiments of the receiving devices 108a-108m are possible and within the scope of this disclosure.

Figure 2:
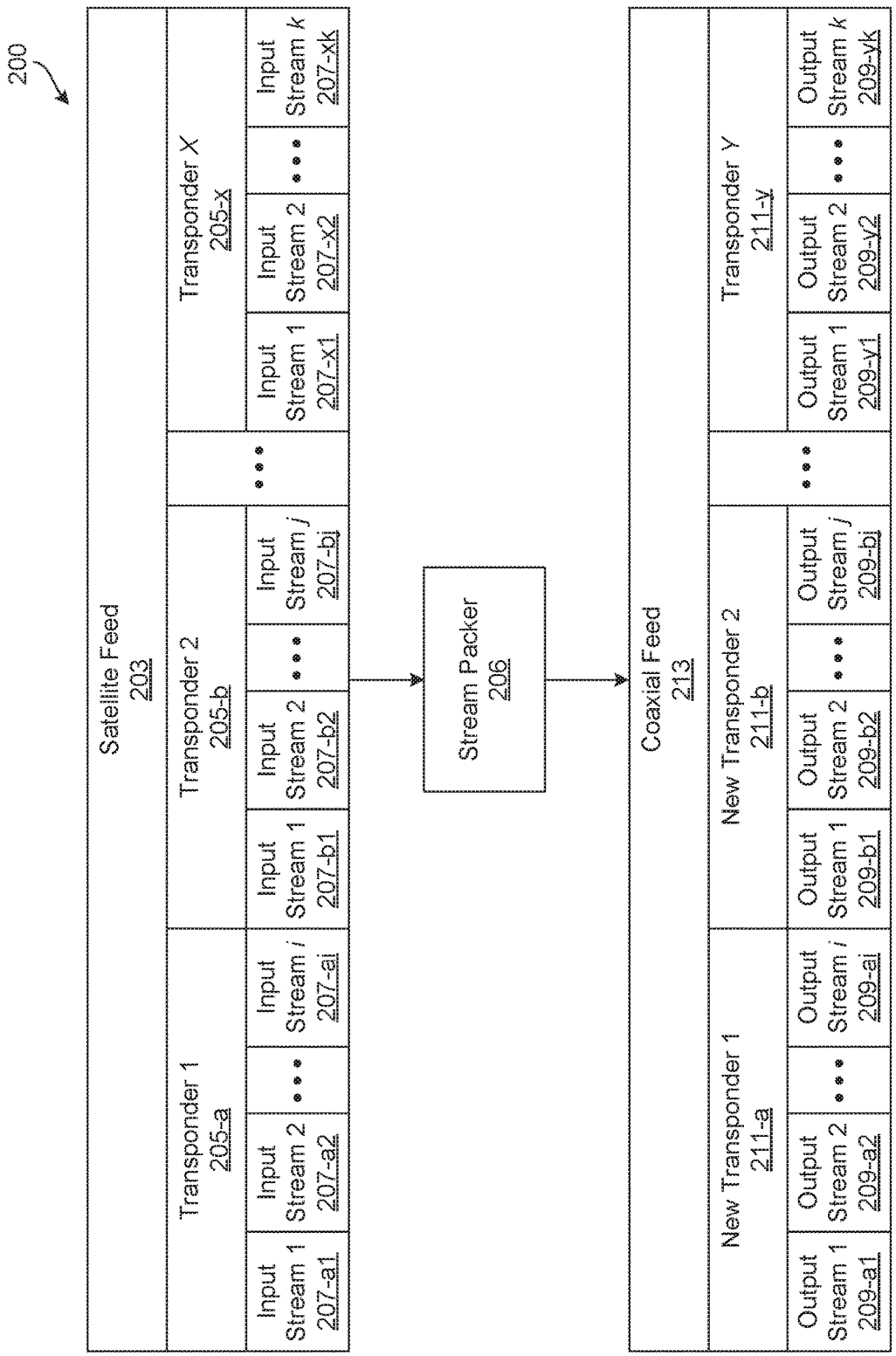
FIG. 2 is a diagram of an example satellite feed and an example coaxial feed 213, according to one non-limiting illustrated embodiment.

FIG. 2 is a diagram of an example satellite feed 203 and an example coaxial feed 213, according to one non-limiting illustrated embodiment. The satellite feed 203 may be an example of one or more of the satellite feeds 103a-103n described in reference to FIG. 1, and the coaxial feed 213 may be an example of the coaxial feed 113 described in reference to FIG. 1.

The satellite feed 203 includes a plurality of transponder signals 205a-205x. Each of the transponder signals 205a-205x correspond to a transponder on a satellite. Each of the transponder signals 205a-205x further include input streams. For example, transponder 205a includes input streams 207a1-207ai, transponder 205b includes input streams 207b1-207bj, and transponder 205x includes input streams 207x1-207xk. It should be understood that the number of transponder signals 205, and the number of input streams 207 included in each transponder signal 205 may vary. The input streams may correspond to video streams containing television programs and/or data streams containing control and informational data for the receiving antenna and/or receiving device.

A stream packer 206 receives the satellite feed 203 from a LNBF. The stream packer 206 may be an example of the stream packer 106 described in reference to FIG. 1. The stream packer 206 may also receive other satellite feeds (not shown) from the same or different LNBFs. In various embodiments, the stream packer 206 may be a component of a LNBF, a standalone device, or a component of a receiving device. In some embodiments, the stream packer 206 may receive the satellite feed 203 at a lower intermediate frequency, after downconversion by the LNBF. In these embodiments, the stream packer may receive the satellite feed 203 from a satellite switch device. The satellite switch device may have multiple ouputs which may provide separate distribution of the satellite feeds to multiple locations (e.g., apartments in an apartment building). The stream packer 206 then demodulates each of the transponder signals 205a-205x included in the satellite feed 203. The individual input streams 207 included in each transponder signal 205 may then be parsed and reassembled, as further described herein.

The stream packer 206 selects input streams 207 to be included in the coaxial feed 213, and parses the selected input streams 207 from their respective transponders 205. The input streams 207 may be selected based on user preferences or other predetermined criteria, such as which video streams are frequently viewed, bandwidth available in the coaxial feed, demodulating and processing capabilities of the receiving device, and/or other criteria. The selected input streams 207 may then be assembled into output streams 209. The output streams 209 may include input streams 207 from one or more other satellite feeds and/or transponders, as further described herein.

The stream packer 206 may then modulate groups of output streams 209 into new transponder signals 211. The new transponder signals 211 may resemble typical downconverted transponder signals received from a satellite. In a preferred embodiment, the number of new transponder signals 211 corresponds to a number of transponders a receiving device is capable of tuning and demodulating. For example, each of the new transponder signals 211 may correspond to a tuner/demodulator available in the receiving device. In some examples, the number of new transponder signals 211 may be larger than the number of transponder signals 205 originally received in the satellite feed 103. By increasing the number of transponder signals, the coaxial feed 213 may include additional streams from other satellite feeds and/or transponders. Furthermore, the streams included in the coaxial feed 213 may be more relevant to a user. The stream packer 206 may add each of the new transponder signals 211 to a channel stack to create the coaxial feed 213. The stacked new transponder signals 211 may efficiently use the bandwidth available for the coaxial feed 213.

Figure 3A:
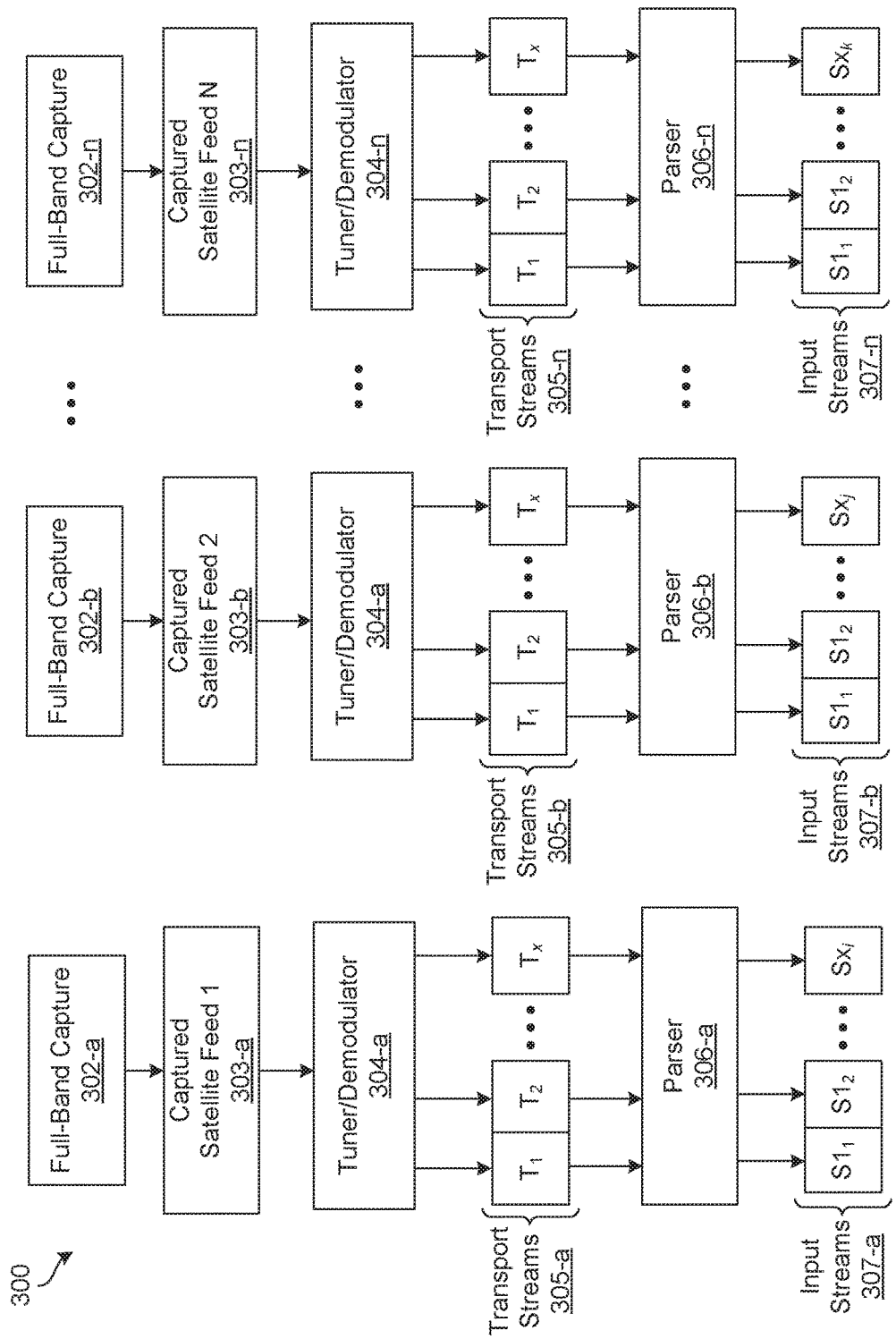
FIG. 3A is a diagram of an example stream packing apparatus, according to one non-limiting illustrated embodiment.

FIG. 3A is a diagram of an example stream packing apparatus 300, according to one non-limiting illustrated embodiment. The stream packing apparatus 300 may be an example of the stream packers 106, 206 described in reference to FIGS. 1-2.

The stream packing apparatus 300 includes full-band capture modules 302a-302n. The full-band capture modules 302a-302n receive satellite feeds 103a-103n from one or more satellites 102a-102n as shown in FIG. 1. Each full-band capture module 302a-302n captures the full frequency spectrum of a satellite feed 103a-103n being broadcast by a satellite 102a-102n. The full-band capture modules 302a-302n may perform a wideband analog to digital conversion of the received satellite feeds 103a-103n. In some embodiments, the full-band capture modules 302a-302n may employ discrete tune/demodulators for capturing the received satellite feeds 103a-103n. The full-band capture modules 302a-302n may operate in parallel to each other in order to capture the satellite feeds 103a-103n approximately simultaneously. Alternatively, in some embodiments, a single full-band capture module may be capable of capturing satellite feeds 103a-103n from multiple satellites 102a-102n approximately simultaneously.

The captured satellite feeds 303a-303n are then demodulated by tuner/demodulators modules 304a-304n. Each tuner/demodulators module 304a-304n may include multiple tuner/demodulators. The tuner/demodulator modules 304a-304n tune to the transponders of each of the captured satellite feeds 303a-303n, then demodulate the transponder signals to generate transport streams 305a-305n. Each of the transport streams 305a-305n correspond to transponder signals from the satellites 102a-102n. While each of the captured satellite feeds 303a-303n are shown having the same number of transport streams (i.e., x transport streams), it should be understood that the number of transport streams demodulated from each captured satellite feed 303a-303n may be different.

Parsers 306a-306n then parse input streams 307a-307n from each of the transport streams 305a-305n. The parsers 306a-306n may parse all of the input streams 307a-307n from each respective transport stream 305a-305n, or the parsers 306a-306n may only parse the input streams 307a-307n that are to be included in the coaxial feed 113. The input streams 307a-307n may correspond to video streams containing television programs and/or data streams containing control and informational data for the receiving antenna and/or receiving device.

Figure 3B:
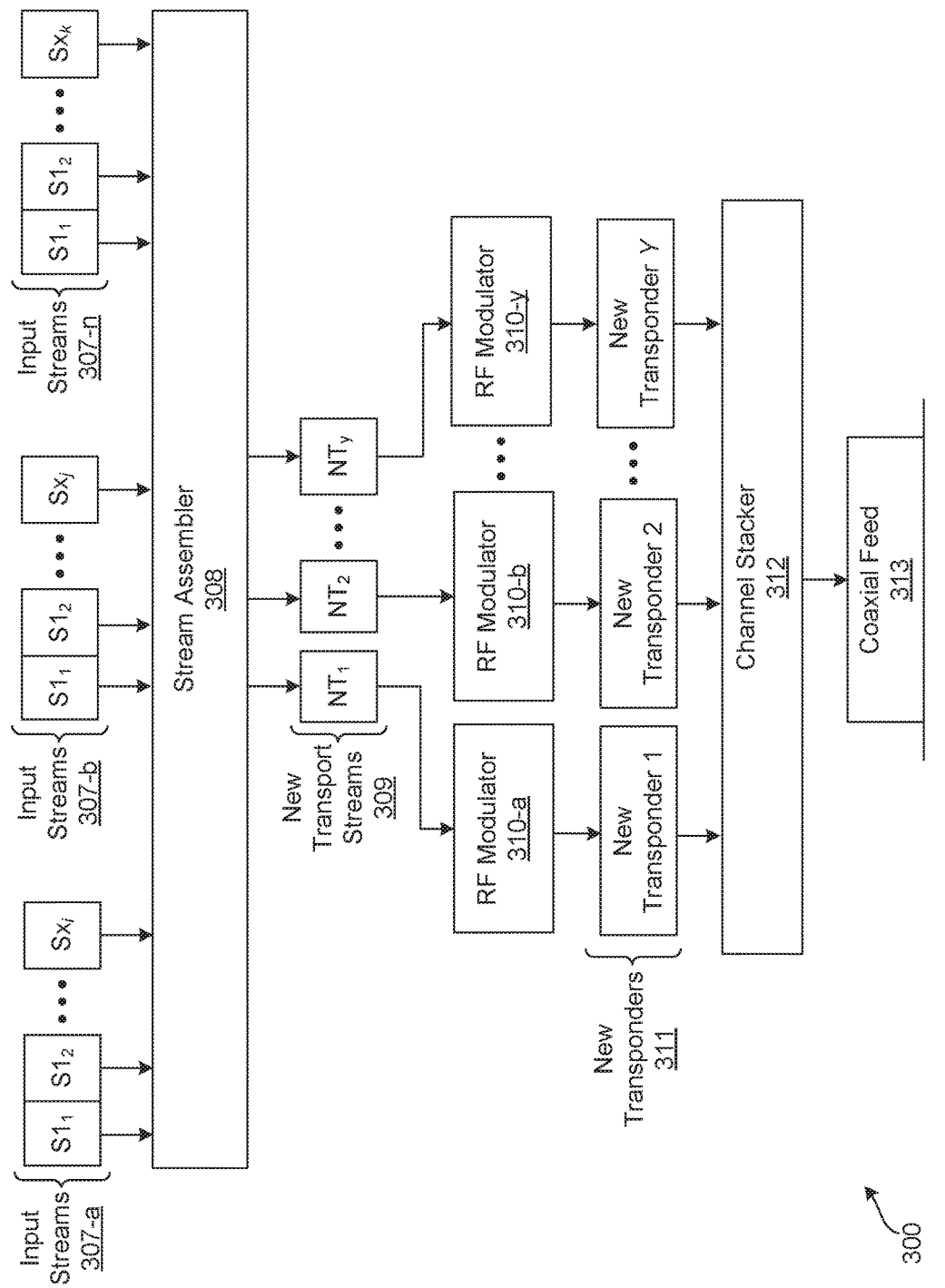
FIG. 3B is a continuation of the example stream packing apparatus shown in FIG. 3A, according to one non-limiting illustrated embodiment.

FIG. 3B is a continuation of the example stream packing apparatus 300 shown in FIG. 3A, according to one non-limiting illustrated embodiment. A stream assembler 308 takes each of the input streams 307a-307n and reassembles them into new transport streams 309. The number of new transport streams 309 may be greater than the number of transport streams demodulated from one satellite feed (i.e., y>x). In a preferred embodiment, the number of new transport streams 309 corresponds to a number of transponders a receiving device is capable of tuning and demodulating.

The new transport streams 309 include output streams selected from the input streams 307a-307n from one or more transport streams 305a-305n. For example, new input stream $NT_1$ may include input stream $S1_1$ from transport stream $T_1$ demodulated from Satellite Feed 1, input stream $S3_2$ from transport stream $T_3$ demodulated from Satellite Feed 2, and input stream $S4_7$ from transport stream $T_4$ demodulated from Satellite Feed 3, among other input streams. The input streams 307 may be selected for the new transport streams 309 based on user preferences or other predetermined criteria, such as which video streams are frequently viewed, bandwidth available in the coaxial feed, demodulating and processing capabilities of the receiving device, and/or other criteria.

The new transport streams 309 may include the same or different numbers of streams as the original transport streams 305a-305n. In some examples, one or more of the new transport streams 309 may include the same group of input streams (e.g., $S1_1$-$S1_j$) as one or more of the original transport streams 305a-305n.

RF modulators 310a-310y then modulate the new transport streams 309 to generate new transponder signals 311. The new transport streams 309 may be modulated so that they resemble typical downconverted transponder signals received from a satellite. Each of the new transponder signals 311 may correspond to a tuner/demodulator available in the receiving device. In some examples, the number of new transponder signals 311 may be larger than the number of transponder signals originally received in each of the captured satellite feeds 303a-303n.

A channel stacker 312 then adds each of the new transponder signals 311 to a channel stack to create a coaxial feed 313. The coaxial feed 313 may be an example of the coaxial feeds 113, 213 described in reference to FIGS. 1 and 2. The stacked new transponder signals 311 may efficiently use the bandwidth available for the coaxial feed 313. A transmitter may transmit the coaxial feed 313 to a receiving device.

The receiving device may utilize tuner/demodulators, as further described herein, in order to receive and process the coaxial feed 313. By including transponder signals in the coaxial feed 313 that resemble typical downconverted transponder signals from a satellite, the coaxial feed 313 may be compatible with a larger number of receiving devices. For example the coaxial feed 313 may be compatible with legacy receiving devices that are only capable of processing typical RF transponder signals, and not capable of processing more recent packetized signals, such as Multimedia over Coax Alliance (MoCA) signals.

Figure 4:
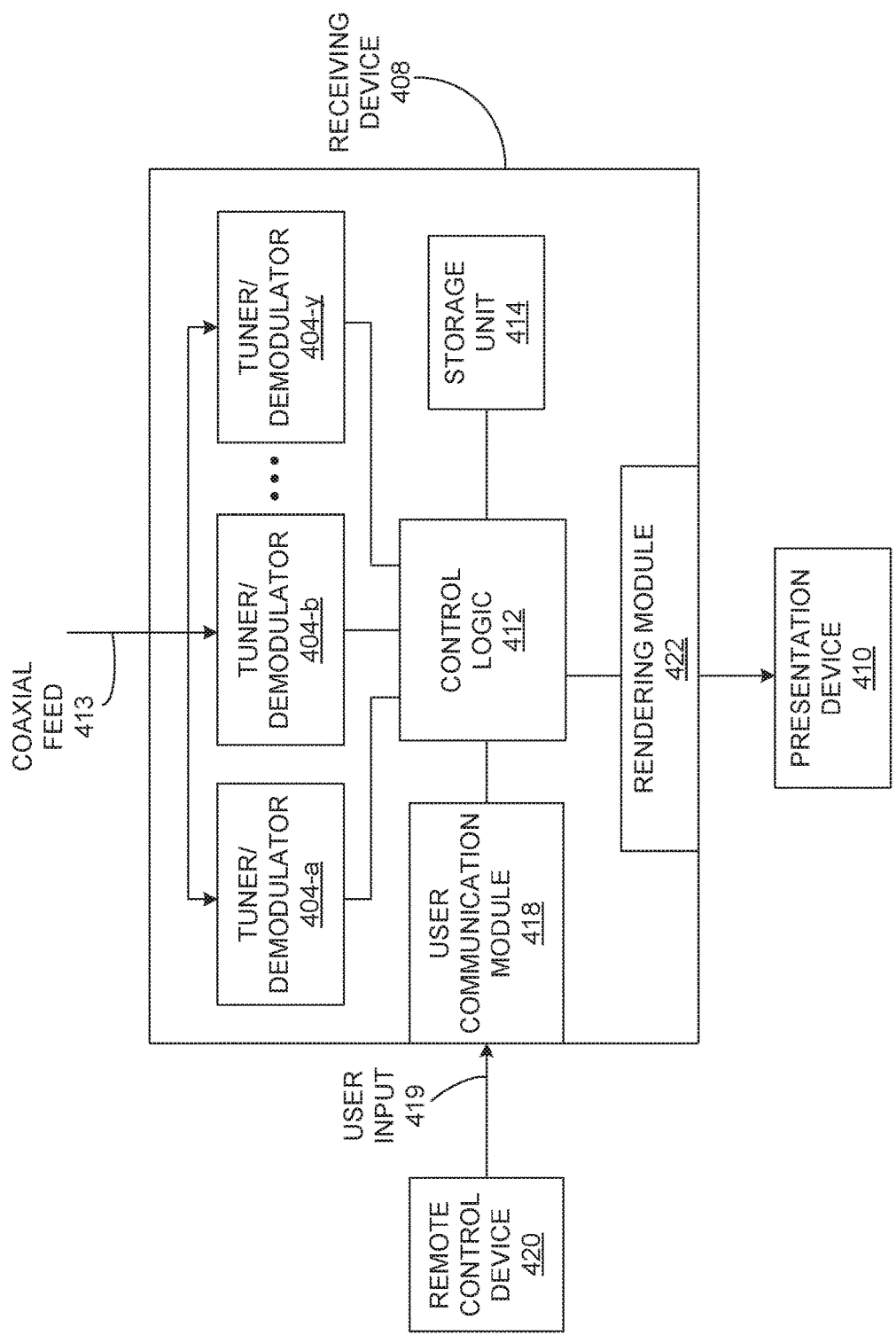
FIG. 4 illustrates an example of a receiving device, according to one non-limiting illustrated embodiment.

FIG. 4 illustrates an example of a receiving device 408, according to one non-limiting illustrated embodiment. The receiving device 408 may be an example of one or more of the receiving devices 108a-108m described in reference to FIG. 1.

The receiving device 408 includes one or more tuner/demodulators 404a-404y. Each tuner/demodulator 404a-404y may tune and process one or more transponder signals from a coaxial feed 413. While shown as individual tuner/demodulators 404a-404y, the receiving device 408 may include one or more wideband tuner/demodulators, each capable of tuning and demodulating multiple transponders from the coaxial feed 413. The coaxial feed 413 may be an example of the coaxial feeds 113, 213, 313 described in reference to FIG. 1-3B. One or more of the transponder signals included in the coaxial feed 413 may correspond to a new transport stream assembled by a stream packer or stream packing apparatus, as described in reference to FIGS. 1-3B. Each transponder signal may represent a distinct frequency sub-band, as modulated by the stream packer. The transponder signals may resemble typical downconverted transponder signals received from a satellite. The number of transponder signals included in the coaxial feed 413 may correspond to the number of tuner/demodulators 404a-404y.

The tuner/demodulators 404a-404y may tune to a particular transponder as part of the process of a user selecting a certain video stream for viewing on a presentation device 410. A control logic 412 may identify which transponder of the coaxial feed 413 includes a selected video stream and instruct the corresponding tuner/demodulator to tune and demodulate the transponder signal. The control logic 412 may identify which transponder should be tuned and demodulated based on a mapping of video streams to transponders. The transponder mapping may be received in one or more data streams included in the coaxial feed 413, or the transponder mapping may be previously received from the coaxial feed 413 or from other data sources. Once a transponder signal has been tuned and demodulated, the control logic 412 may receive the resulting transport stream and may extract the selected video stream.

One or more storage units 414 may be included internal and/or external to the receiving device 408. The storage unit 414 may store recorded video streams and/or other control or informational data, such as the transponder mapping. The control logic 412 may coordinate the storage and retrieval of video streams or other data to/from the storage unit 414.

The receiving device 408 may also include a user communication module 418, control logic 412, and a rendering module 422. The user communication module 418 receives user input 419 from a remote control device 420. The rendering module 422 renders a video stream into a presentable format for the presentation device 410. The control logic 412 may coordinate the output of a video stream to the rendering module 422. Furthermore, the receiving device 408 may include other components, modules, elements, or devices not illustrated for the sake of brevity.

FIG. 5A illustrates an example of a new transponder signal 511a, according to one non-limiting illustrated embodiment. The new transponder signal 511a may be an example of one or more of the new transponder signals described in reference to FIGS. 2 and 3B. The new transponder signal 511a includes video streams 509 and entitlement management message/entitlement control message (EMM/ECM) information 515. The video streams 509 may be examples of one or more of the output streams 209 described in reference to FIG. 2. While shown with 10 video streams 509, the new transponder signal 511a may include different numbers of video streams 509 based on the capabilities of a receiving device, the size of the video streams, or other criteria.

The video streams 509 may be selected by a stream packer from input streams received from multiple satellites and/or transponders. The video streams 509 may be selected based on user preferences or other predetermined criteria, such as which video streams are frequently viewed, bandwidth available in the coaxial feed, demodulating and processing capabilities of the receiving device, and/or other criteria. The EMM/ECM information 515 provides the receiving device with information to decrypt and decode the video streams 509. In some embodiments, the EMM/ECM information 515 may be sent to the receiving device in other transponder signals or through separate communication means. In these embodiments, the new transponder signal 511a may include one or more additional video streams 509 in place of the EMM/ECM information 515.

FIG. 5B illustrates an example of a new transponder signal 511b, according to one non-limiting illustrated embodiment. The new transponder signal 511b may be an example of one or more of the new transponder signals described in reference to FIGS. 2 and 3B. The new transponder signal 511b includes informational data streams. The informational data streams may be examples of one or more of the output streams 209 described in reference to FIG. 2.

The informational data streams may provide informational and control data to a receiving device. The informational data streams may include EMM/ECM information 515, network information table/network address translation (NIT/NAT) information 517, program acquisition table/program map table (PAT/PMT) information 519, transponder information 521, LNBF information 523, signal quality information 525, and/or other informational and control data.

A stream packer or stream packing apparatus (as described in reference to FIGS. 1-3B) may receive the informational and control data from multiple satellites and/or transponders. The stream packer may parse out the informational and control data from the input streams, and compile the data into one or more of the informational data streams included in the new transponder signal 511b. For example, the NIT/NAT information 517 may be compiled to provide NIT/NAT information for the all of the new transponder signals assembled by the stream packer. Similarly, the PAT/PMT information 519 may be compiled to provide PAT/PMT information for the all of the new transponder signals assembled by the stream packer. The transponder information 521 may be compiled to provide information (e.g., modulation information, frequency information, etc.) for all active transponders from one or more satellites scanned by a receiving antenna. The LNBF information 523 may provide diagnostic and status information for each of the LNBFs of the receiving antenna. The signal quality information 525 may provide signal strength information for the all of the transponder signals as they were originally received by the receiving antenna. The signal quality information 525 may allow a receiving device to diagnose distribution issues by comparing the signal strength at the demodulators in the stream packer as compared to the signal strength at the demodulators in the receiving device.

Figure 6:
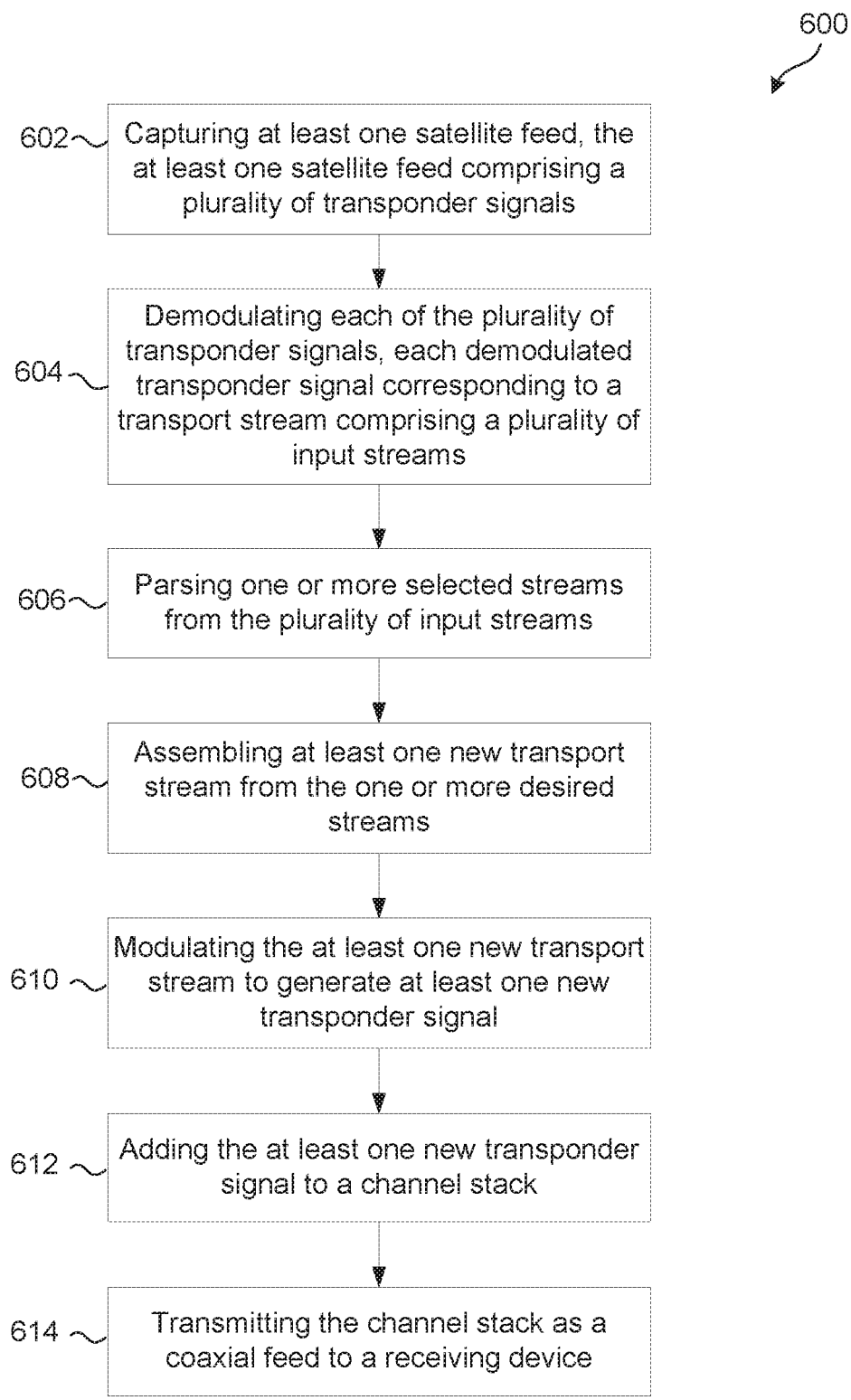
FIG. 6 is a flow diagram showing a stream packing method for signals received by a receiving antenna, according to one non-limiting illustrated embodiment.

FIG. 6 is a flow diagram showing a stream packing method 600 for signals received by a receiving antenna, according to one non-limiting illustrated embodiment. The receiving antenna may be an example of the receiving antenna 104 described in reference to FIG. 1. The stream packing method 600 may be performed by a stream packer, such as the stream packers or stream packing apparatus described in reference to FIGS. 1-3B. The stream packer may be a component of the receiving antenna, a component of a receiving device, or a standalone device.

At 602, a full-band capture module captures at least one satellite feed. The at least one satellite feed includes a plurality of transponder signals. The plurality of transponder signals may be from a plurality of satellite feeds.

At 604, a tuner/demodulator demodulates each of the plurality of transponder signals. Each demodulated transponder signal corresponds to a transport stream comprising a plurality of input streams.

At 606, a parser parses one or more selected streams from the plurality of input streams. The streams may be selected based on user preferences, bandwidth available in a coaxial feed, capabilities of the receiving device, or a combination thereof. The parser may also parse informational and control data from the plurality of input streams. The informational and control data may include one or more of entitlement management message/entitlement control message (EMM/ECM) information, network information table/network address translation (NIT/NAT) information, program acquisition table/program map table (PAT/PMT) information, transponder information, LNBF information, and signal quality information.

At 608, a stream assembler assembles at least one new transport stream from the one or more selected streams. The stream assembler may assemble a plurality of new transport streams from the one or more selected streams. The number of new transport streams may exceed the number of transponder signals from a single satellite feed. The number of new transport streams may also be associated with a tuning capability of the receiving device. The stream assembler may also assemble at least one informational transport stream from informational and control data parsed by the parser.

At 610, a RF modulator modulates the at least one new transport stream to generate at least one new transponder signal. The at least one new transport stream may be modulated to resemble a downconverted transponder signal from a LNBF.

At 612, a channel stacker adds the at least one new transponder signal to a channel stack. The stacked new transponder signals may efficiently use the bandwidth available for a coaxial feed.

At 614, a transmitter transmits the channel stack to a receiving device. The channel stack may be transmitted to the receiving device as a coaxial feed.

The method 600 may include additional acts, omit some acts, and/or may perform the acts in a different order than set out in the FIG. 6.

Figure 7:
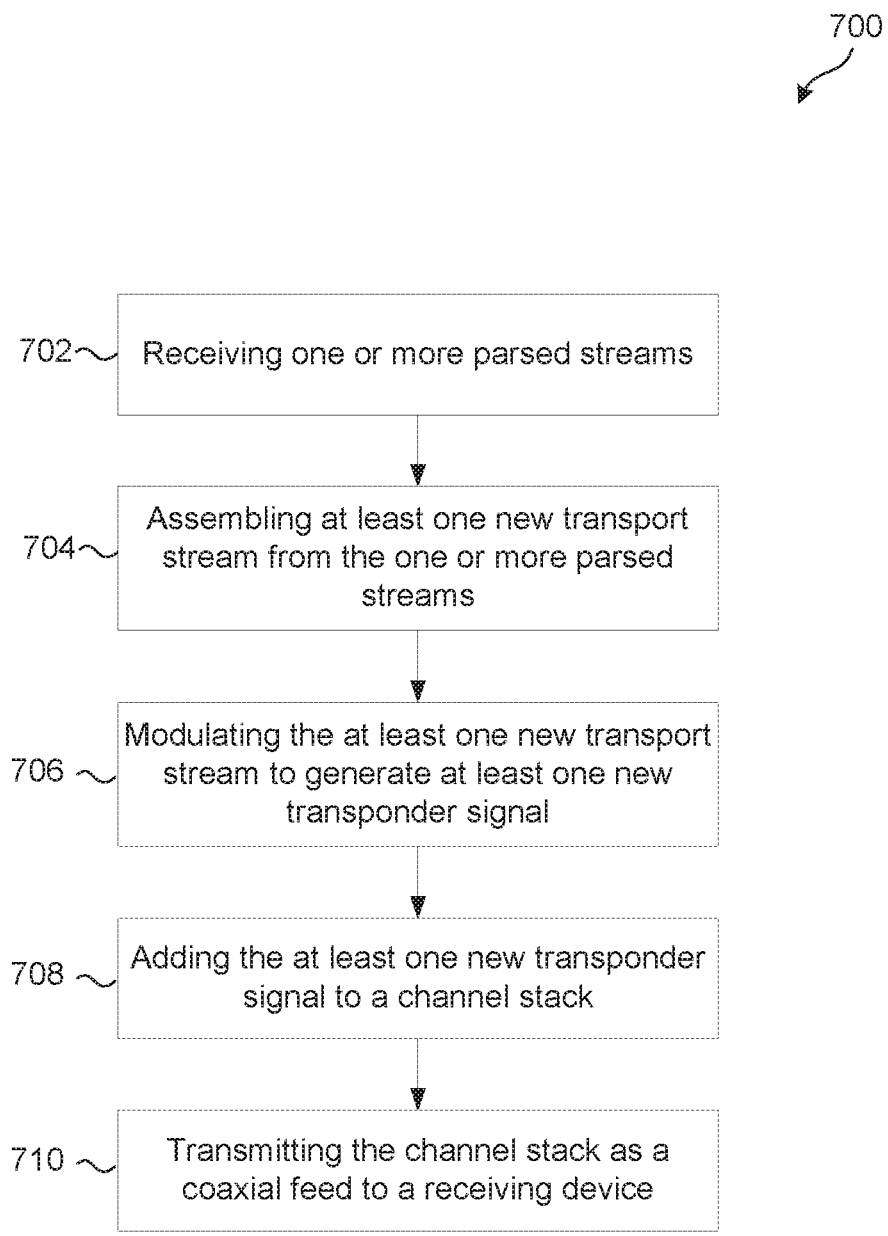
FIG. 7 is a flow diagram showing another stream packing method, according to one non-limiting illustrated embodiment.

FIG. 7 is a flow diagram showing another stream packing method 700, according to one non-limiting illustrated embodiment. The stream packing method 700 may be performed by a stream packer, such as the stream packers or stream packing apparatus described in reference to FIGS. 1-3B. The stream packer may be a component of the receiving antenna, a component of a receiving device, or a standalone device.

At 702, one or more parsed streams are received. The streams may have been parsed by a parser associated with a satellite feed. In some embodiments, the streams may have been parsed by a parser associated with other audiovisual content feeds, such as an over-the-air broadcast feed, a cable television feed, an internet feed, etc.

At 704, a stream assembler assembles at least one new transport stream from the one or more parsed streams. The stream assembler may assemble a plurality of new transport streams from the one or more parsed streams. The number of new transport streams may exceed the number of transponder signals from a single satellite feed. The number of new transport streams may also be associated with a tuning capability of the receiving device. The stream assembler may also assemble at least one informational transport stream from informational and control data parsed by the parser.

At 706, a RF modulator modulates the at least one new transport stream to generate at least one new transponder signal. The at least one new transport stream may be modulated to resemble a downconverted transponder signal from a LNBF.

At 708, a channel stacker adds the at least one new transponder signal to a channel stack. The stacked new transponder signals may efficiently use the bandwidth available for a coaxial feed.

At 710, a transmitter transmits the channel stack to a receiving device. The channel stack may be transmitted to the receiving device as a coaxial feed.

The method 700 may include additional acts, omit some acts, and/or may perform the acts in a different order than set out in the FIG. 7.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that many functions and/or operations within such block diagrams (e.g., the functions of the stream packer or stream packing apparatus), flowcharts, or examples can be implemented, individually and/or collectively, by a wide range of hardware, software, firmware, or virtually any combination thereof and that designing the circuitry and/or writing the code for the software and/or firmware would be well within the skill of one of ordinary skill in the art in light of the teachings of this disclosure. For example, the functions of the stream packer could be implemented in discrete logic with no central processing unit (CPU) or software involvement.

When logic is implemented as software and stored in memory, logic or information can be stored on any non-transitory computer-readable medium for use by or in connection with any processor-related system or method. In the context of this disclosure, a memory is a nontransitory computer- or processor-readable storage medium that is an electronic, magnetic, optical, or other physical device or means that non-transitorily contains or stores a computer and/or processor program. Logic and/or the information can be embodied in any computer-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "computer-readable medium" can be any physical element that can store the program associated with logic and/or information for use by or in connection with the instruction execution system (e.g., the control logic 412), apparatus, and/or device. The computer-readable medium can be, for example, but is not limited to, an electronic, magnetic, optical, electromagnetic, infrared, or semiconductor system, apparatus or device.

More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), and digital tape.

The various embodiments described above can be combined to provide further embodiments. Aspects of the embodiments can be modified, if necessary, to employ systems, circuits and concepts of the various patents, applications and publications to provide yet further embodiments.

The above description of illustrated embodiments, including what is described in the Abstract, is not intended to be exhaustive or to limit the embodiments to the precise forms disclosed. Although specific embodiments and examples are described herein for illustrative purposes, various equivalent modifications can be made without departing from the spirit and scope of the disclosure, as will be recognized by those skilled in the relevant art.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method, comprising:
    capturing at least one satellite feed, the at least one satellite feed comprising a plurality of transponder signals;
    demodulating each of the plurality of transponder signals, each demodulated transponder signal corresponding to a transport stream comprising a plurality of input streams;
    parsing one or more selected streams from the plurality of input streams;
    assembling at least one new transport stream from the one or more selected streams;
    modulating the at least one new transport stream to generate at least one new transponder signal;
    adding the at least one new transponder signal to a channel stack;
    transmitting the channel stack to a receiving device;
    parsing informational and control data from the plurality of input streams; and
    assembling at least one informational transport stream from the informational and control data.

2. The method of claim 1, wherein the plurality of transponder signals are from a plurality of satellite feeds.

3. The method of claim 2, further comprising:
    assembling a plurality of new transport streams from the one or more selected streams, wherein the number of new transport streams exceeds the number of transponder signals from a single satellite feed.

4. The method of claim 3, wherein the number of new transport streams is associated with a tuning capability of the receiving device.

5. The method of claim 1, further comprising:
    selecting the one or more selected streams based on user preferences, bandwidth available in a coaxial feed, capabilities of the receiving device, or a combination thereof.

6. The method of claim 1, wherein the informational and control data includes one or more of entitlement management message/entitlement control message (EMM/ECM) information, network information table/network address translation (NIT/NAT) information, program acquisition table/program map table (PAT/PMT) information, transponder information, LNBF information, and signal quality information.

7. The method of claim 1, wherein the channel stack is transmitted to the receiving device as a coaxial feed.

8. A stream packing apparatus, comprising:
    a capture module for capturing at least one satellite feed, the at least one satellite feed comprising a plurality of transponder signals;
    a demodulator for demodulating each of the plurality of transponder signals, each demodulated transponder signal corresponding to a transport stream comprising a plurality of input streams;
    a parser for parsing one or more desired streams from the plurality of input streams, wherein the parser parses informational and control data from the plurality of input streams;
    a stream assembler for assembling at least one new transport stream from the one or more desired streams, wherein the stream assembler assembles at least one informational transport stream from the informational and control data;
    a radio frequency (RF) modulator for modulating the at least one new transport stream to generate at least one new transponder signal;
    a RF combiner for adding the at least one new transponder signal to a channel stack; and
    a transmitter for transmitting the channel stack to a receiving device.

9. The stream packing apparatus of claim 8, wherein the plurality of transponder signals are from a plurality of satellite feeds.

10. The stream packing apparatus of claim 9, wherein the stream assembler assembles a plurality of new transport streams from the one or more selected streams, and wherein the number of new transport streams exceeds the number of transponder signals from a single satellite feed.

11. The stream packing apparatus of claim 10, wherein the number of new transport streams is associated with a tuning capability of the receiving device.

12. The stream packing apparatus of claim 8, wherein the one or more selected streams are selected based on user preferences, bandwidth available in a coaxial feed, capabilities of the receiving device, or a combination thereof.

13. The stream packing apparatus of claim 8, wherein the informational and control data includes one or more of entitlement management message/entitlement control message (EMM/ECM) information, network information table/network address translation (NIT/NAT) information, program acquisition table/program map table (PAT/PMT) information, transponder information, LNBF information, and signal quality information.

14. The stream packing apparatus of claim 1, wherein the transmitter transmits the channel stack to the receiving device as a coaxial feed.

15. A satellite communication system, comprising:
    a receiving antenna including at least one low-noise frequency block downconverter with integrated feedhorn (LNBF);
    a receiving device in communication with the receiving antenna; and a stream packer intermediate the receiving antenna and the receiving device, the stream packer comprising;
   a capture module for capturing at least one satellite feed from the at least one LNBF, the at least one satellite feed comprising a plurality of transponder signals;
   a demodulator for demodulating each of the plurality of transponder signals, each demodulated transponder signal corresponding to a transport stream comprising a plurality of input streams;
   a parser for parsing one or more desired streams from the plurality of input streams, wherein the parser parses informational and control data from the plurality of input streams;
   a stream assembler for assembling at least one new transport stream from the one or more desired streams, wherein the stream assembler assembles at least one informational transport stream from the informational and control data;
   a radio frequency (RF) modulator for modulating the at least one new transport stream to generate at least one new transponder signal;
   a RF combiner for adding the at least one new transponder signal to a channel stack; and
   a transmitter for transmitting the channel stack to the receiving device.

16. The satellite communication system of claim 15, wherein the plurality of transponder signals are from a plurality of satellite feeds.

17. The satellite communication system of claim 16, wherein the stream assembler assembles a plurality of new transport streams from the one or more selected streams, and wherein the number of new transport streams exceeds the number of transponder signals from a single satellite feed.

* * * * *